US012106674B1

(12) United States Patent
Cleckler et al.

(10) Patent No.: US 12,106,674 B1
(45) Date of Patent: Oct. 1, 2024

(54) TERRESTRIAL ACOUSTIC SENSOR ARRAY

(71) Applicant: SCIENTIFIC APPLICATIONS & RESEARCH ASSOCIATES, INC., Cypress, CA (US)

(72) Inventors: Jay B. Cleckler, Long Beach, CA (US); Jesse L. Klang, Colorado Springs, CO (US); Sheida Danesh, Westminister, CA (US); Mark E. Walker, Fullerton, CA (US); James A. Wes, Diamond Bar, CA (US); Robert Francis Dircks, Westminster, CA (US)

(73) Assignee: SCIENTIFIC APPLICATIONS & RESEARCH ASSOCIATES, INC., Cypress, CA (US)

( * ) Notice: Subject to any disclaimer, the term of this patent is extended or adjusted under 35 U.S.C. 154(b) by 0 days.

(21) Appl. No.: 18/101,429

(22) Filed: Jan. 25, 2023

Related U.S. Application Data

(63) Continuation of application No. 16/570,950, filed on Sep. 13, 2019, now Pat. No. 11,594,142.

(60) Provisional application No. 62/778,713, filed on Dec. 12, 2018.

(51) Int. Cl.
| | | |
|---|---|---|
| *G08G 5/04* | (2006.01) | |
| *B64C 39/02* | (2023.01) | |
| *G01S 19/01* | (2010.01) | |
| *G01V 1/00* | (2006.01) | |
| *G01W 1/00* | (2006.01) | |
| *G05D 1/00* | (2006.01) | |
| *H04R 1/40* | (2006.01) | |
| *H04R 3/00* | (2006.01) | |
| *G01S 3/80* | (2006.01) | |

(52) U.S. Cl.
CPC ............... *G08G 5/04* (2013.01); *B64C 39/02* (2013.01); *G01S 19/01* (2013.01); *G01V 1/001* (2013.01); *G01W 1/00* (2013.01); *G05D 1/101* (2013.01); *H04R 1/406* (2013.01); *H04R 3/005* (2013.01); *B64U 2201/104* (2023.01); *H04R 2499/13* (2013.01)

(58) Field of Classification Search
CPC . G01S 3/802; G01S 3/808; G01S 5/22; G01S 11/14; G08G 5/04; B64C 39/02; G05D 1/10
See application file for complete search history.

(56) References Cited

U.S. PATENT DOCUMENTS

| | | | | |
|---|---|---|---|---|
| 6,034,760 A | * | 3/2000 | Rees | G01S 17/95 356/342 |
| 7,606,115 B1 | * | 10/2009 | Cline | G08G 5/045 367/136 |
| 7,916,887 B2 | | 3/2011 | Clecker et al. | |

(Continued)

*Primary Examiner* — Tan Q Nguyen
(74) *Attorney, Agent, or Firm* — STETINA BRUNDA GARRED & BRUCKER

(57) ABSTRACT

A terrestrial acoustic sensor array for detecting and preventing airspace collision with an unmanned aerial vehicle (UAV) includes a plurality of ground-based acoustic sensor installations, each of the acoustic sensor installations including a sub-array of microphones. The terrestrial acoustic sensor array may further include a processor for detecting an aircraft based on sensor data collected from the microphones of at least one of the plurality of acoustic sensor installations and a network link for transmitting a signal based on the detection of the aircraft to a control system of the UAV.

20 Claims, 8 Drawing Sheets

(56) References Cited

U.S. PATENT DOCUMENTS

| | | | |
|---|---|---|---|
| 8,059,489 B1 * | 11/2011 | Lee | G01N 29/46 |
| | | | 367/136 |
| 9,632,171 B1 * | 4/2017 | Herold | G01S 3/801 |
| 9,685,089 B2 | 6/2017 | Panczan et al. | |
| 2009/0257314 A1 * | 10/2009 | Davis | G01S 5/18 |
| | | | 367/125 |
| 2018/0210065 A1 * | 7/2018 | Shams | G01S 5/22 |

* cited by examiner

BPF = Blade Passing Frequency

TERRESTRIAL ACOUSTIC SENSOR ARRAY

CROSS-REFERENCE TO RELATED APPLICATIONS

The present application is a continuation of U.S. patent application Ser. No. 16/570,950, filed Sep. 13, 2019, and entitled TERRESTRIAL ACOUSTIC SENSOR ARRAY, which claims priority to U.S. Provisional Patent Application Ser. No. 62/778,713, filed Dec. 12, 2018, and entitled TERRESTRIAL ACOUSTIC SENSOR ARRAY, the entire contents of all of which are incorporated by reference herein.

STATEMENT RE: FEDERALLY SPONSORED RESEARCH/DEVELOPMENT

Not Applicable

BACKGROUND

1. Technical Field

The present disclosure relates generally to airspace collision detection and, more particularly, to a ground-based acoustic airspace collision detection system for piloted and unmanned aircraft.

2. Related Art

Civilian applications of unmanned aerial vehicles (UAVs), such as homeland security, law enforcement, agriculture, and shipping/delivery services, have great promise but remain hampered by National Airspace System (NAS) regulations limiting the use of UAVs to predetermined flight corridors, restricted access zones, live oversight by a human operator and direct visual observation of the airspace by the human operator. Such restrictions are likely to remain in place until UAVs can be flown with the equivalent level of safety as piloted aircraft, particularly with the same or better attention to manned aircraft in their mutual airspace. To this end, developments have been made to fit UAVs with acoustic airspace collision warning systems that detect the sound radiated by an approaching aircraft (e.g. a manned aircraft) to estimate the position and direction of the aircraft. Examples of such systems are described in U.S. Pat. Nos. 7,606,115, 7,916,887, and 9,685,089, the entire disclosure of each of which is hereby wholly incorporated by reference. However, such systems increase the size and weight of the UAV and require design considerations for distinguishing the sound generated by the approaching aircraft from the sound generated by the UAV itself. Moreover, in cases where many UAVs are expected to transit the same corridor, such UAV-based detection systems may become overly complex and impractical in practice.

BRIEF SUMMARY

The present disclosure contemplates various systems and methods for overcoming the above drawbacks accompanying the related art. One aspect of the embodiments of the present disclosure is a terrestrial acoustic sensor array for detecting and preventing airspace collision with an unmanned aerial vehicle (UAV). The terrestrial acoustic sensor array may include a plurality of ground-based acoustic sensor installations, each of the acoustic sensor installations including a sub-array of microphones. The terrestrial acoustic sensor array may include a processor for detecting an aircraft based on sensor data collected from the microphones of at least one of the plurality of acoustic sensor installations. The terrestrial acoustic sensor array may include a network link for transmitting a signal based on the detection of the aircraft to a control system of the UAV.

The processor may identify the aircraft type based on the sensor data.

The processor may calculate a flight path of the aircraft based on the sensor data. The processor may calculate the flight path of the aircraft based on combined sensor data collected from the microphones of at least two of the plurality of acoustic sensor installations. Each of the plurality of acoustic sensor installations may include a global positioning system (GPS) receiver. The processor may calculate the flight path of the aircraft further based on GPS data collected from the GPS receivers of the at least one of the plurality of acoustic sensor installations.

The sub-array of microphones of each of the plurality of acoustic sensor installations may be arranged to distinguish azimuth and elevation of received sounds. The sensor data may include azimuth and elevation data collected from the microphones of at least one of the plurality of acoustic sensor installations.

The sensor data may include frequency and amplitude data collected from the microphones of the at least one of the plurality of acoustic sensor installations.

Each of the plurality of acoustic sensor installations may include a tower structure for disposing the sub-array of microphones at an elevated height.

Each of the plurality of acoustic sensor installations may include a body for mounting the sub-array of microphones to a building or terrain feature.

The processor and network link may be disposed in a master node of the terrestrial acoustic sensor array that is communicatively coupled to the plurality of acoustic sensor installations by a wireless network. The master node may comprise a cloud computing environment.

The processor may be disposed in a master node of the terrestrial acoustic sensor array that is communicatively coupled to the plurality of acoustic sensor installations by a wireless network. The master node may comprise a cloud computing environment.

The transmitted signal may be further based on a position or flight path of the UAV. The processor may determine the position or flight path of the UAV based on a communication received by the network link from the UAV. The processor may calculate a rate of change of a relative bearing of the aircraft to the UAV. The transmitted signal may be further based on the calculated rate of change.

At least one of the plurality of acoustic sensor installations may include one or more weather station instruments. The transmitted signal may be further based on a measurement of the one or more weather station instruments.

At least one of the plurality of acoustic sensor installations may include a transponder receiver. The transmitted signal may be further based on transponder data of the aircraft received by the transponder receiver.

The control system of the UAV may comprise a human-operated pilot console that generates a human-interpretable warning in response to receipt of the transmitted signal.

The control system of the UAV may comprise a flight controller included in the UAV that controls a position of the UAV in response to receipt of the transmitted signal. The flight controller may initiate an evasive maneuver of the UAV or reroute the UAV in response to receipt of the transmitted signal. The flight controller may reroute the UAV to an airspace that is non-navigable by manned aircraft in response to receipt of the transmitted signal. Alternatively, the flight controller may reroute the UAV to a direction or position that avoids a collision or other conflict with the detected aircraft.

Another aspect of the embodiments of the present disclosure is a system including the terrestrial acoustic sensor array and the UAV. The UAV may include a global positioning system (GPS) receiver. The transmitted signal may be further based on GPS data collected from the GPS receiver of the UAV.

Another aspect of the embodiments of the present disclosure is a non-transitory program storage medium on which are stored instructions executable by a processor or programmable circuit to perform operations for detecting and preventing airspace collision with an unmanned aerial vehicle (UAV). The operations may include detecting an aircraft based on sensor data collected from microphones of at least one of a plurality of ground-based acoustic sensor installations and transmitting a signal based on the detection of the aircraft to a control system of the UAV.

Another aspect of the embodiments of the present disclosure is a method of detecting and preventing airspace collision with an unmanned aerial vehicle (UAV). The method may include detecting an aircraft based on sensor data collected from microphones of at least one of a plurality of ground-based acoustic sensor installations and transmitting a signal based on the detection of the aircraft to a control system of the UAV.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of systems and methods for detecting and preventing airspace collision with an unmanned aerial vehicle (UAV). The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
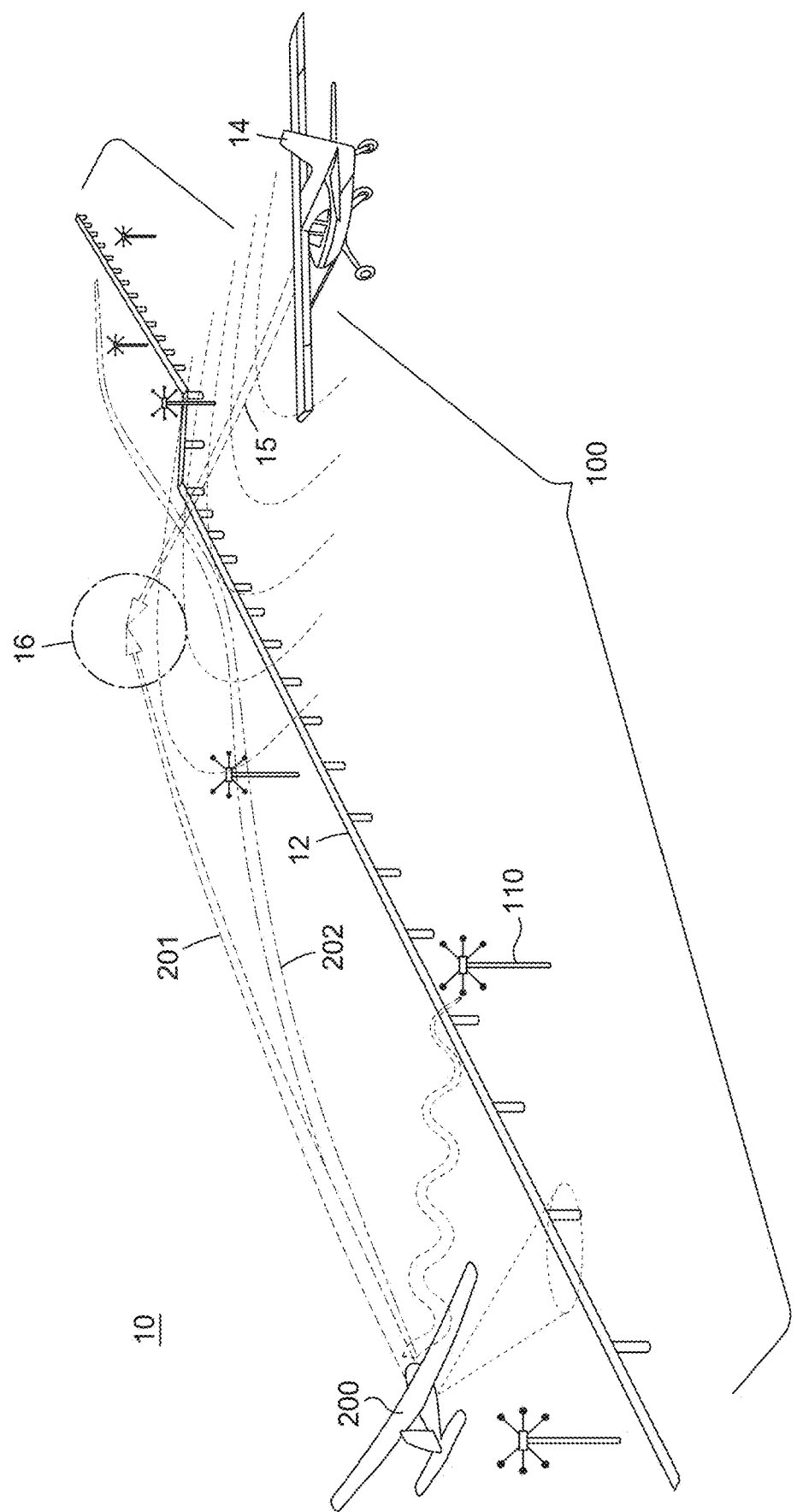
FIG. 1 shows an example system including a terrestrial acoustic sensor array and an unmanned aerial vehicle (UAV) according to an embodiment of the present disclosure.

FIG. 1 shows an example system 10 including a terrestrial acoustic sensor array 100 and an unmanned aerial vehicle (UAV) 200 according to an embodiment of the present disclosure. The UAV 200 may be a drone of any type including, for example, a fixed wing drone as shown, a multirotor or multicopter drone, a single rotor drone, or a hybrid thereof. In the example of FIG. 1, the UAV 200 has been deployed to inspect or monitor a pipeline 12, such as a methane pipeline, requiring the UAV 200 to share airspace with general aviation (GA) manned aircraft traffic. At the moment in time depicted in FIG. 1, an aircraft 14 (e.g. a manned aircraft) is crossing the pipeline 12 near the UAV 200, creating a risk of collision. The terrestrial acoustic sensor array 100, which includes a plurality of ground-based acoustic sensor installations 110, may collect acoustic data of the approaching aircraft 14 and determine that the UAV 200 and aircraft 14 are on a collision course as represented by the convergence of a UAV flight path 201 and an aircraft flight path 15 at a collision site 16. The terrestrial acoustic sensor array 100 may prevent the collision by warning or controlling the UAV 200 to avoid the aircraft 14, allowing the UAV 200 to safely pass underneath the aircraft 14 along the modified UAV flight path 202.

Figure 2:
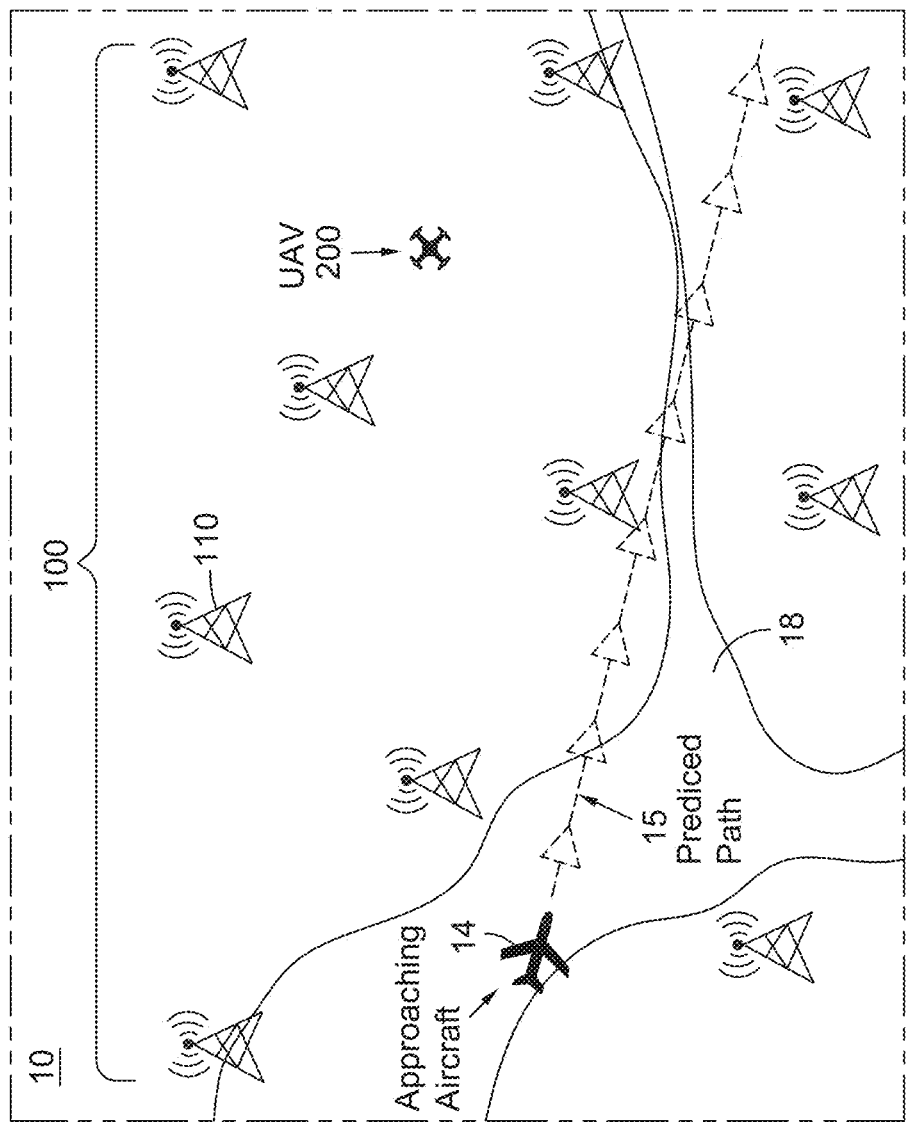
FIG. 2 is a schematic overhead view of the system.

FIG. 2 is a schematic overhead view of the system 10. In the example of FIG. 2, the UAV 200 has been deployed to survey or map a geographic feature 18, such as a flood plain, and the aircraft 14 is crossing the geographic feature 18 near the site of UAV operations. In this example, rather than detecting that the aircraft 14 and the UAV 200 are on a collision course, the terrestrial acoustic sensor array 100 only detects the aircraft 14 without reference to the precise position or flight path of the UAV 200. The terrestrial acoustic sensor array 100 may further identify the aircraft type of the aircraft 14 and/or calculate the flight path 15 of the aircraft 14. Based on the detection of the aircraft 14 and/or the calculated flight path 15, the terrestrial acoustic sensor array 100 may then warn or control the UAV 200 to avoid the possibility of a collision, for example, by rerouting the UAV 200 to an airspace that is non-navigable by manned aircraft (e.g. close to the ground).

Figure 3:
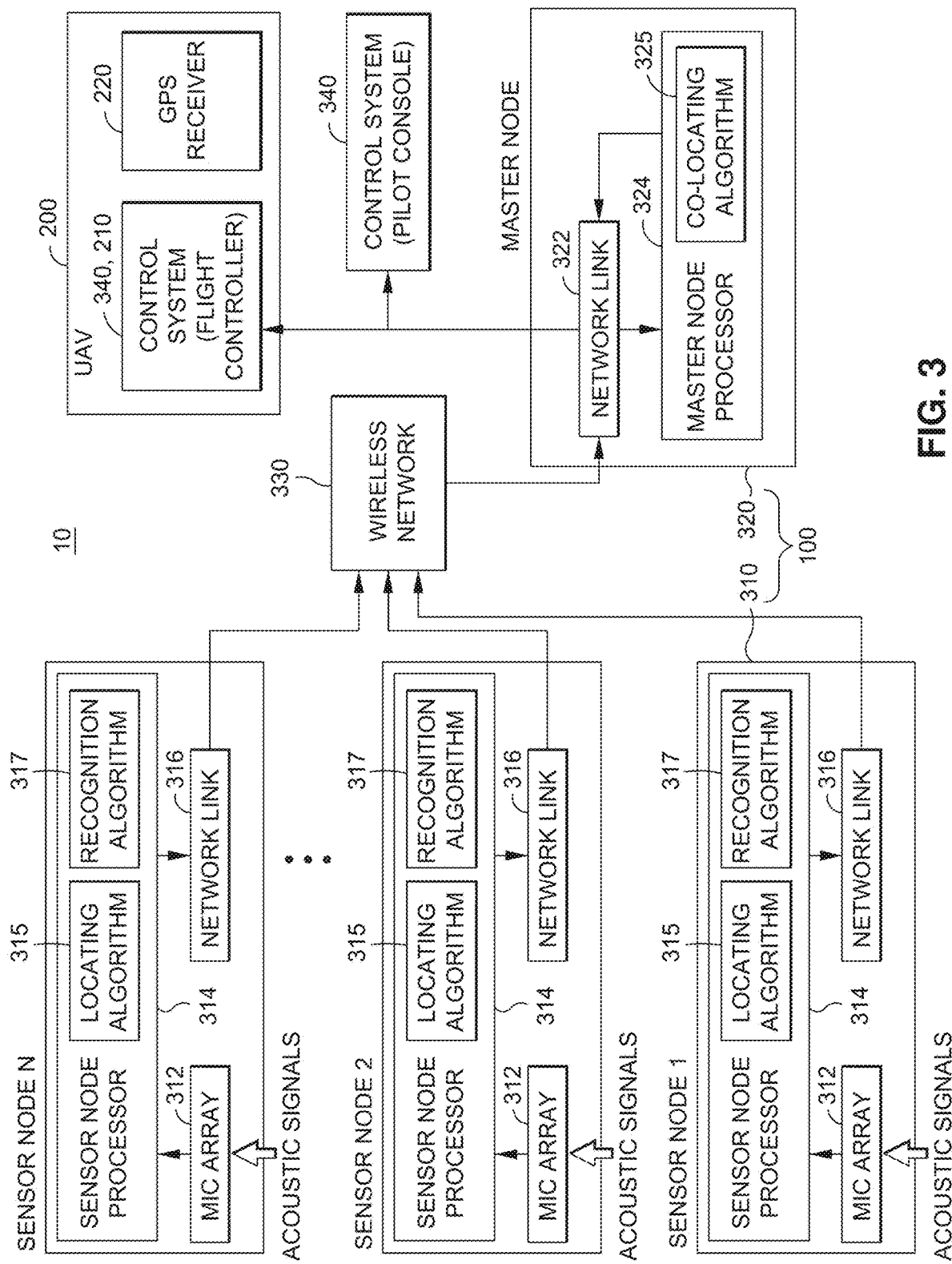
FIG. 3 is an internal view of the system.

FIG. 3 is an internal view of the system 10. As shown, the terrestrial acoustic sensor array 100 may be logically divided into sensor nodes 310 that are chiefly responsible for capturing acoustic data and making initial estimates regarding a detected aircraft 14 and master nodes 320 that are chiefly responsible for processing the acoustic data and/or estimates collected from multiple sensor nodes and communicating with a control system 340 of the UAV 200. Each of the sensor nodes 310 may correspond to and represent the internal components and functionality of a ground-based acoustic sensor installation 110 of the terrestrial acoustic sensor array 100 shown in FIG. 1 or 2. The master node 320 may represent the internal components and functionality of a computer that may be provided separately from the acoustic sensor installations 110 at a central location (e.g. a hub facility or a cloud computing environment running master node software) or in place of one of the acoustic sensor installations 110. Alternatively, as shown in the example of FIG. 1, the master node 320 may itself, like the sensor nodes 310, correspond to and represent the internal components of an acoustic sensor installation 110. This is illustrated by the communication between one of the acoustic sensor installations 110 and the UAV 200 as shown. In this case, the master node 320 may capture its own acoustic data to combine with the acoustic data of the sensor nodes 310. The responsibilities of master nodes 320 and sensor nodes 310 may thus be shared and the master node 320 may effectively serve as an enhanced sensor node 310. Such enhanced sensor nodes 310 may replace ordinary sensor nodes 310 at regular intervals throughout the terrestrial acoustic sensor array 100 in order to share computing resources, maintain communication signal strength, and reduce latency. In some cases, all sensor nodes 310 may be enhanced sensor nodes, with no distinction made between sensor nodes 310 and master nodes 320 throughout the entire terrestrial acoustic sensor array 100. In all cases, the functionality described in relation to each sensor node 310 and/or the master node 320 may in part be embodied in one or more local and/or cloud-based processors (e.g. microprocessors) coupled with associated software instructions residing locally in one or more non-transitory program storage media and/or in a cloud computing environment running sensor node and/or master node software.

For ease of explanation, the N sensor nodes 310 and single master node 320 shown by way of example in FIG. 3 have distinct responsibilities, with the N sensor nodes 310 capturing acoustic data and making initial estimates with respect to the location and identity of the aircraft 14 and the master node 320 processing the acoustic data and/or estimates collected from the N sensor nodes 310 and communicating with the control system 340 of the UAV 200. For capturing the acoustic data, each of the sensor nodes 310 (and thus each of the acoustic sensor installations 110) may include a sub-array 312 of microphones. Each of the sensor nodes 310 may further include a sensor node processor 314 and a network link 316 to a wireless network 330 (e.g. using a 4G wireless standard such as Long Term Evolution or a 5G wireless standard). While it is contemplated that a wired network may be used instead of the wireless network 330, the use of a wireless network 330 makes installation of the terrestrial acoustic sensor array 100 easier as wiring does not need to be connected between the nodes 310, 320 of the terrestrial acoustic sensor array 100, especially in the case of a temporary installation or a semi-permanent installation whose coverage area is expected to be modified from time to time. Bandwidth of the wireless network 330 may be ≤10 kbps/node, with latency of ≤1 second.

The microphone sub-array 312 of each sensor node 310 may be arranged so as to distinguish the direction of a sound in three dimensions, for example, to distinguish azimuth and elevation of a received sound. In order to avoid picking up irrelevant ground-based sounds, the microphone sub-array 312 of each sensor node 310 may be disposed at an elevated height, for example, at the top of the respective acoustic sensor installation 110. In this regard, each of the acoustic sensor installations 110 may comprise a tower structure for disposing the sub-array 312 of microphones at an elevated height of, for example, 50-500 feet, preferably 100-200 feet. Alternatively, the acoustic sensor installations 110 may be attached to existing structures (e.g. rooftops, telephone poles, cellphone towers, etc.) in order to dispose the microphone sub-arrays 312 at an elevated height.

As sounds are picked up by the microphone sub-array 312 of a sensor node 310, the sensor node processor 314 may process the raw acoustic data or noise-filtered data thereof to produce sensor data indicative of the direction of the sound using a locating algorithm 315. The locating algorithm 315 may run the data through a beamformer. For example, with an appropriately arranged microphone sub-array 312, the sensor node processor 314 may produce sensor data that includes azimuth and elevation data determined from the raw acoustic data of the individual microphones in the microphone sub-array 312 (e.g. based on a time delay or phase shift between the raw acoustic data picked up from each microphone and the known relative positions of each microphone). The sensor data produced by the sensor node processor 314 may further include frequency and/or amplitude data of the sound based on the raw acoustic data. It is contemplated that the frequency range discernible by the sensor node 310 may be, for example, 20-20,000 Hz. In some cases, the sensor node processor 314 may additionally identify the source of the raw acoustic data including, for example, the aircraft type (e.g. model, size, engine, etc.), using a recognition algorithm 317. The recognition algorithm 317 may, for example, generate a descriptor based on the raw acoustic data (e.g. comprising values derived from frequency, amplitude, position, position derivatives such as speed or acceleration, etc.) and match the descriptor to a signature of a known airplane or other sound source in a database to produce recognition data identifying the source. As another example, the recognition algorithm 317 may employ machine learning such as a neural network to train the sensor node processor 314 to recognize specific aircraft. The sensor data produced by the sensor node processor 314 may further include such recognition data. The network link 316 may communicate the sensor data produced by the sensor node processor 314, including any estimates as to the position and/or identity of the aircraft 14, to the master node 320 over the wireless network 330. The sensor node processor 314 may further include a flight data recorder that records time-tagged real-time results/status and/or time-tagged raw acoustic data.

The master node 320 (which may be embodied in one of the acoustic sensor installations 110 or in a separate computer or cloud as described above) may include a network link 322 and a master node processor 324. The master node processor 324 may detect an aircraft such as the aircraft 14 based on sensor data collected from the microphones of at least one of the plurality of acoustic sensor installations 110, for example, based on the sensor data produced by one or more sensor nodes 310 and received over the wireless network 330 via the network link 322. Using the sensor data of one or more sensor nodes 310, which may include azimuth and elevation data, frequency data, and/or amplitude data collected from the microphones of the acoustic sensor installation(s) 110 as described above, the master node processor 324 may execute a co-locating algorithm 325 to refine the estimates produced by the sensor node(s) 310 and establish a higher degree of confidence in the detection of the aircraft 14 as well as in the result of any identifying and/or locating of the aircraft 14 as performed by the individual sensor node(s) 310. The master node processor 324 may further calculate a flight path 15 of the aircraft 14 based, for example, on a determination of an estimated position of the aircraft 14, an estimated heading of the aircraft 14, an estimated speed of the aircraft 14, an estimated acceleration of the aircraft 14, or a combination thereof. For example, the position of the aircraft 14 may be estimated by triangulation methods using the combined azimuth and elevation data of the sensor data produced by two sensor nodes 310 disposed at known positions. To this end, the master node processor 324 may further base the estimated position on global positioning system (GPS) data of the sensor nodes 310 as described in more detail below. Heading, speed, and/or acceleration of the aircraft 14 may then be estimated using position estimates made at two or more successive times. In this regard, it is contemplated that the sensor data transmitted from each sensor node 310 to the master node 320 may include time data associated therewith. Alternatively, the co-locating algorithm 325 may assign time stamps to the sensor data as the sensor data is received by the master node 320 over the network link 322. The calculated flight path 15 may consist of one or more aspects of a predicted path that the aircraft 14 will take, for example, a bearing and speed of the aircraft 14, an expected future position of the aircraft 14, etc.

With the aircraft 14 having been detected by the master node processor 324, the network link 322 may transmit a signal based on the detection of the aircraft 14 to a control system 340 of the UAV 200 (e.g. over the wireless network 300 or a separate wireless communication modality). The transmitted signal may further include a calculated flight path 15 of the aircraft 14 as calculated by the master node processor 324 and/or recognition data identifying the sound source (e.g. the aircraft type) as described above. In the case of a piloted UAV 200, the control system 340 of the UAV 200 may comprise a human-operated pilot console that generates a human-interpretable warning in response to receipt of the transmitted signal. For example, the signal transmitted from the master node 320 may include the calculated flight path 15 of the aircraft 14, and the warning generated by the control system 340 may include an indication of the flight path 15, such as a relative bearing between the aircraft 14 and the UAV 200 or a graphical representation of the flight path 15 in relation to the position of the UAV 200. The human pilot may then move the UAV 200 to avoid the aircraft 14, for example, by executing an evasive maneuver, by rerouting the UAV 200 to avoid the aircraft 14 (e.g. adding an additional waypoint to a programmed route of the UAV 200), or simply by rerouting the UAV 200 to an airspace that is non-navigable by manned aircraft (e.g. close to the ground). Alternatively, the signal transmitted from the master node 320 may not include an indication of the flight path 15, for example, in a case where the flight path 15 is not calculated and the aircraft 14 is merely detected (e.g. the presence of an aircraft within a vicinity). The signal transmitted from the master node 320 may thus constitute only a generic warning signal. In response to receipt of the warning signal, the pilot console may simply generate an audio and/or visual warning (e.g. an alarm tone or light), signifying that the human pilot should reroute the UAV 200 to an airspace that is non-navigable by manned aircraft (e.g. close to the ground), irrespective of the exact flight path of the aircraft 14.

In the case of a UAV 200 having an automatic guidance system, the control system 340 of the UAV 200 may comprise a flight controller 210 included in the UAV 200 that controls a position of the UAV 200 in response to receipt of the transmitted signal. The flight controller 210 may, for example, receive inputs from various sensors (e.g. gyroscope, accelerometer, magnetometer, barometer, etc.) as well as control signals such as a signal transmitted by the master node 320 as described herein. The flight controller 210 may control the motors and flight control surfaces (e.g. ailerons, elevators, rudders, etc.) of the UAV 200 in response to such inputs and control signals. As above, the signal transmitted from the master node 320 may include a calculated flight path 15 of the aircraft 14, in which case the flight controller 210 may move the UAV 200 to avoid the aircraft 14, for example, by executing an evasive maneuver, by rerouting the UAV 200 to avoid the aircraft 14 (e.g. adding an additional waypoint to a programmed route of the UAV 200), or simply by rerouting the UAV 200 to an airspace that is non-navigable by manned aircraft (e.g. close to the ground). Alternatively, as in the case of the piloted UAV 200, the signal transmitted from the master node 320 may not include an indication of the flight path 15, constituting only a generic warning signal. In response to receipt of the warning signal, the flight controller 210 may simply reroute the UAV 200 to an airspace that is non-navigable by manned aircraft (e.g. close to the ground), irrespective of the exact flight path of the aircraft 14.

The signal transmitted by the master node 320 to the control system 340 of the UAV 200 may be further based on a position or flight path 201 of the UAV 200. In this way, the master node 320 may more precisely determine that a collision with a particular UAV 200 is imminent. To this end, the network link 322 of the master node 320 may receive a communication from the UAV 200 including information indicative of the position or flight path 201 of the UAV 200. As an example, the UAV 200 may include a global positioning system (GPS) receiver 220, and the master node 320 may collect GPS data from the GPS receiver 220 and determine the position or flight path 201 of the UAV 200 therefrom. The determination of the flight path 201 of the UAV 200 may use a portion of the co-locating algorithm 325 described above and may, for example, be based on successive GPS data points received from the UAV 200 over a period of time. The signal transmitted from the master node 320 to the UAV 200 warning or controlling the UAV 200 of the approaching aircraft 14 may thus be based on GPS data collected from the GPS receiver 220 of the UAV 200. In this way, the terrestrial acoustic sensor array 100 may determine that the UAV 200 and aircraft 14 are on a collision course as shown in FIG. 1.

In the above examples of the sensor node 310 and master node 320, it is described that the master node processor 324 may calculate the flight path 15 of the aircraft 14 based on sensor data collected from the sensor node(s) 310. However, it is also contemplated that the sensor node processor(s) 314 (e.g. the locating algorithm(s) 315 thereof) may themselves calculate a first estimate of the flight path 15 of the aircraft 14 and/or track the aircraft 14 as it moves through the vicinity of each sensor node 210. In this case, the master node processor 324 may receive one or more such estimates of the flight path 15 or tracking data from sensor nodes 310 and refine the one or more estimates to establish the calculated flight path 15. Along the same lines, it is contemplated that each individual sensor node 310 may receive GPS data collected from the GPS receiver 20 of the UAV 200, with the sensor node processor(s) 314 calculating a first estimate of the possibility of a collision and the master node processor 324 thereafter refining the estimate(s). In a case where initial estimates are made at the sensor node 310 level (e.g. detection of aircraft, locating, flight path, tracking, identity, etc.) and later refined at the master node 320 level based on collected sensor data from multiple sensor nodes 310, the accuracy may be improved because multiple estimates may be compared and because the microphones may be spread out over greater distances for better resolution of the raw acoustic data. In addition, the use of multiple sensor nodes 310 may allow for a greater physical range of detection as the terrestrial acoustic sensor array 100 may be spread out over a large region.

Figure 4:
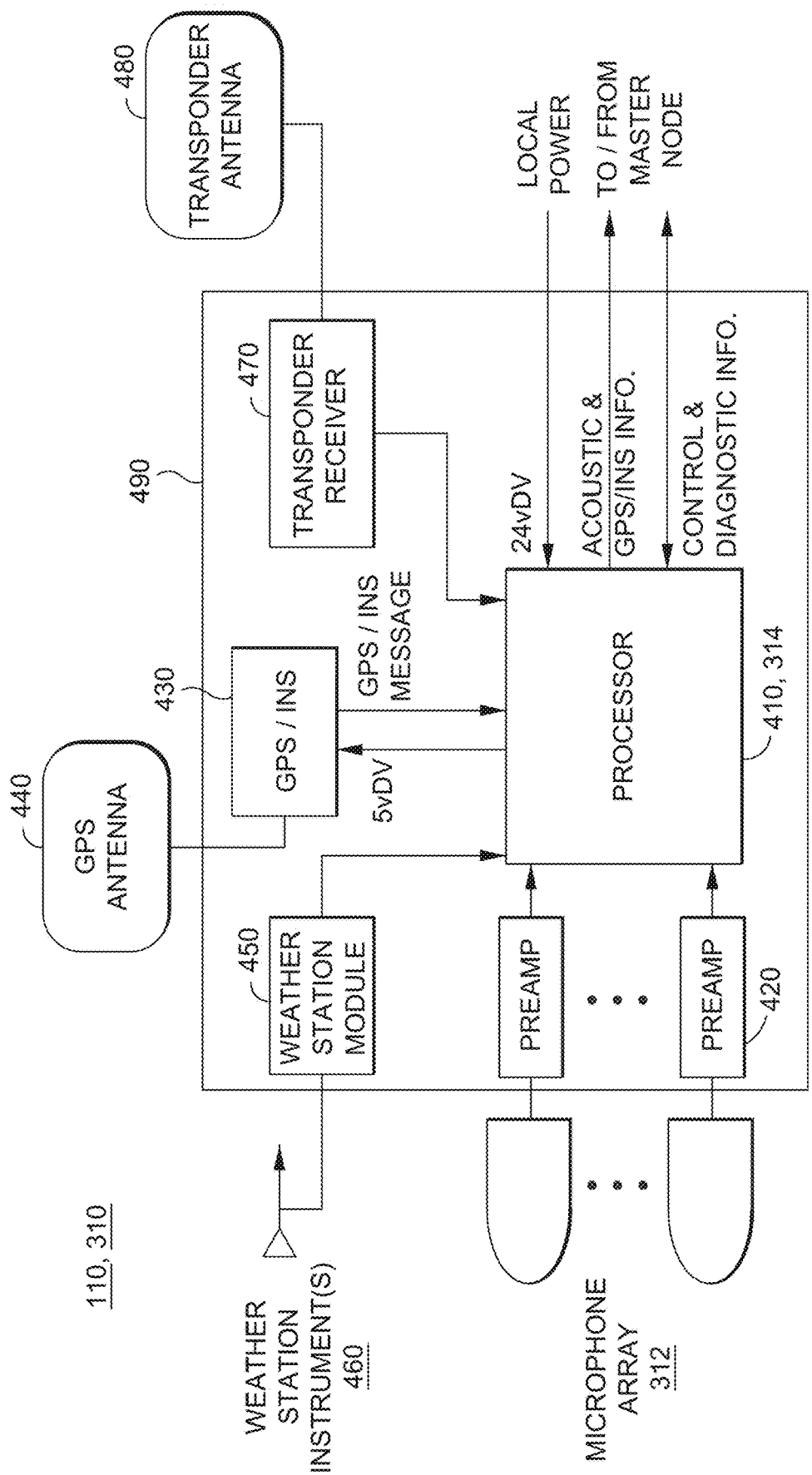
FIG. 4 is an internal view of a sensor node of the terrestrial acoustic sensor array.

FIG. 4 is an internal view of a sensor node 310 of the terrestrial acoustic sensor array 100. As shown in FIG. 4, electronic components of each sensor node 310 may include the microphone array 312 and a processor 410 (e.g. a microprocessor) that may function as the sensor node processor 314, as well as one or more preamplifiers 420 for receiving a raw acoustic signal from the microphone array 312 and amplifying the signal to produce input data to the processor 410, a global positioning system (GPS) antenna 440 for receiving GPS signals (e.g. from satellites), and a GPS/inertial navigation system (INS) 430 that generates a GPS/INS message based on the GPS signals. The GPS/INS system 430 may include a GPS receiver that receives the GPS signals from multiple satellites and an INS module that may generate magnetometer, gyroscope, and/or accelerometer data to be corrected or calibrated by the GPS signals. The processor 410 may determine the position of the sensor node 310 (e.g. of the acoustic sensor installation 110) or, more specifically, the positions of the microphones of the microphone array 312, based on the resulting GPS/INS message. In this way, the sensor node 310 may include a node self-survey system that maintains a known position and orientation of the acoustic sensor installation 110, allowing the acoustic sensor installation 110 to be moved from time to time depending on the changing needs of the terrestrial acoustic sensor array 100 while still being able to accurately detect aircraft such as the aircraft 14. Owing to the INS module of the GPS/INS system 430, a tilt or sway in a tower structure of the acoustic sensor installation 110 can be accounted for and the accuracy of the microphone array 312 can be maintained. As shown, and as described above in relation to FIG. 3, it is also contemplated that acoustic and/or GPS/INS data may be communicated to another node such as a master node 320 for further processing and refinement of estimates.

One or more of the sensor nodes 310 may further include a weather station module 450 coupled to one or more weather station instruments 460, such as a thermometer, barometer, wind vane, wind sock, anemometer, hygrometer, pyranometer, rain gauge, precipitation sensor, etc. The weather station module 450 may determine current or predicted environmental conditions (e.g. a current wind speed, a forecasted chance of storm, etc.) from measurements of the one or more weather station instruments 460. The processor 410, 314 and or a downstream master node processor 324 may thus take into consideration the current or predicted environmental conditions (or multiple such readings/predictions) when transmitting the signal to warn or control the UAV 200. For example, based on weather conditions as determined from weather station modules 450 of one or more sensor nodes 310, the master node processor 324 may determine that a requested UAV maneuver is not advisable due to high winds. As a result, the master node processor 324 may instead recommend a temporary suspension of all UAV flights.

One or more of the sensor nodes 310 may further include a transponder receiver 470 operable to receive aircraft transponder signals via a transponder antenna 480. The transponder receiver 470 may, for example, be an Automatic Dependent Surveillance-Broadcast (ADS-B) receiver. Depending on the equipment installed on the incoming aircraft 14, transponder data included in a signal received by the transponder receiver 470 may include an identification of the aircraft 14, an altitude of the aircraft 14, a GPS location of the aircraft 14, etc. The processor 410, 314 and or a downstream master node processor 324 may thus take into consideration the transponder data when identifying, locating, or calculating a flight path 15 of the aircraft 14. The resulting more accurate and/or more detailed determinations may allow the master node 320 to better advise or control the UAV 200.

Figure 5:
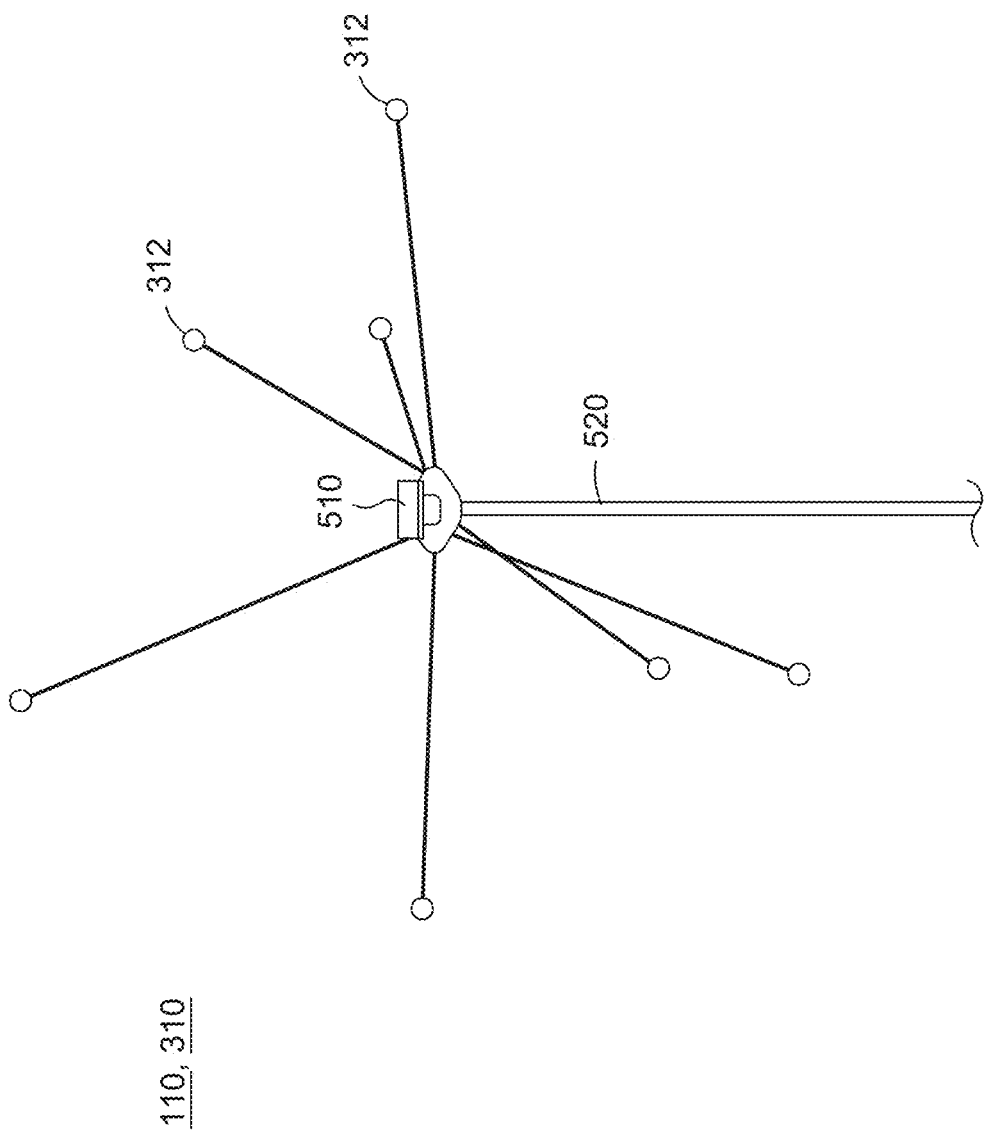
FIG. 5 is an external view of a sensor node of the terrestrial acoustic sensor array.

FIG. 5 is an external view of a sensor node 310 of the terrestrial acoustic sensor array 100. As shown, the external structure of an acoustic sensor installation 110 serving as the sensor node 310 may include a body 510 from which the microphone array 312 extends outward in three dimensions. The microphone array 312 may include, for example, eight microphones arranged to distinguish azimuth and elevation of received sounds. The body 510 may contain, for example one or more printed circuit boards 490 (see FIG. 4) including the internal electronic components of the sensor node 310. The body 510 may be supported by a tower structure 520 for disposing the microphone array 312 at an elevated height to avoid ground-based acoustic noise, for example, 50-500 feet, preferably 100-200 feet. Alternatively, as noted above, the tower structure 520 may be omitted and the acoustic sensor installation 110 including the microphone array 312 may be installed on a pre-existing structure at the elevated height. For example, the body 510 of the acoustic sensor installation 110 may be mounted (e.g. bolted) to a building or terrain feature.

Figure 6:
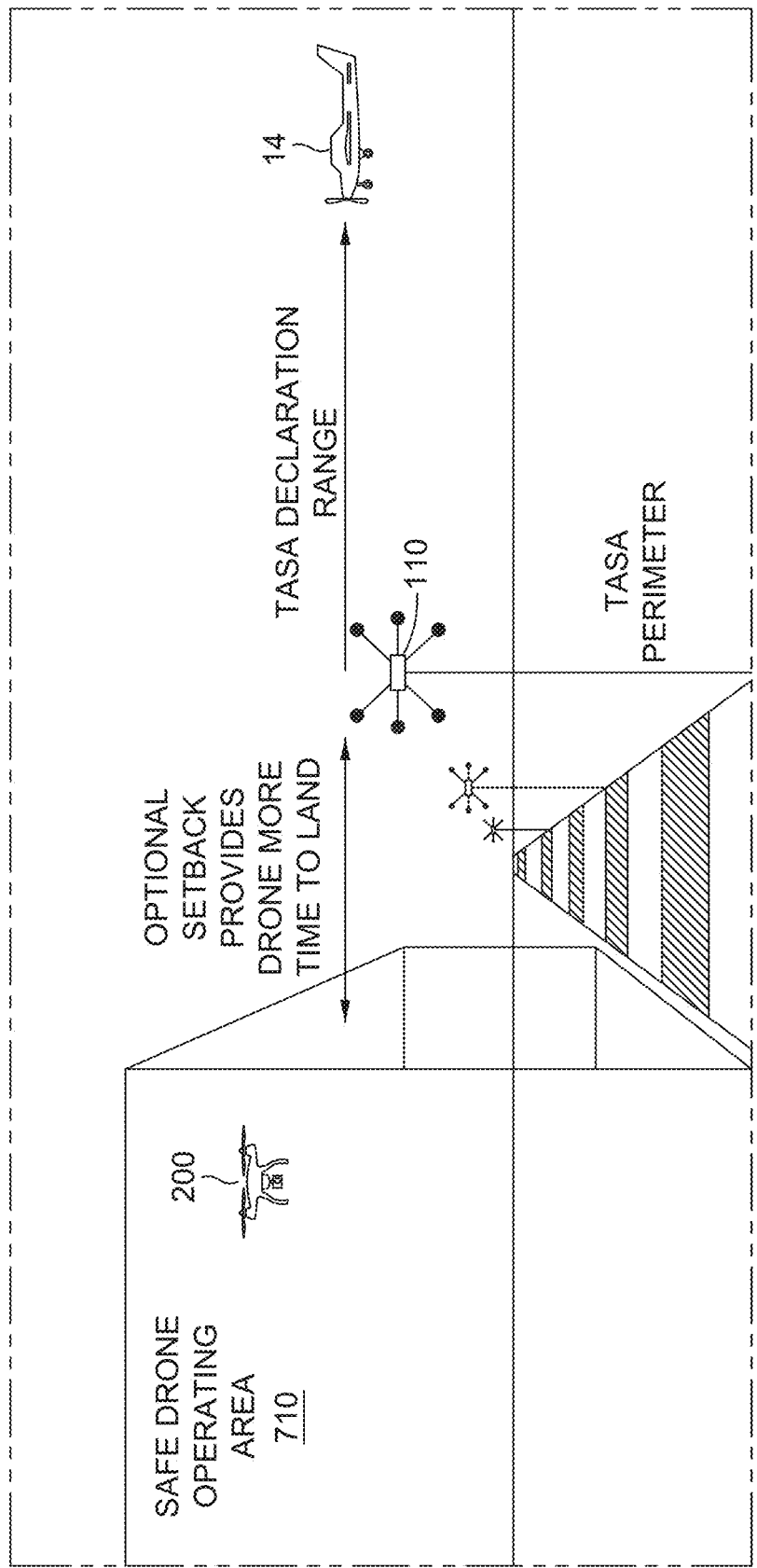
FIG. 6 is a schematic side view of the system illustrating a "keep-out" concept of operations.
Figure 7:
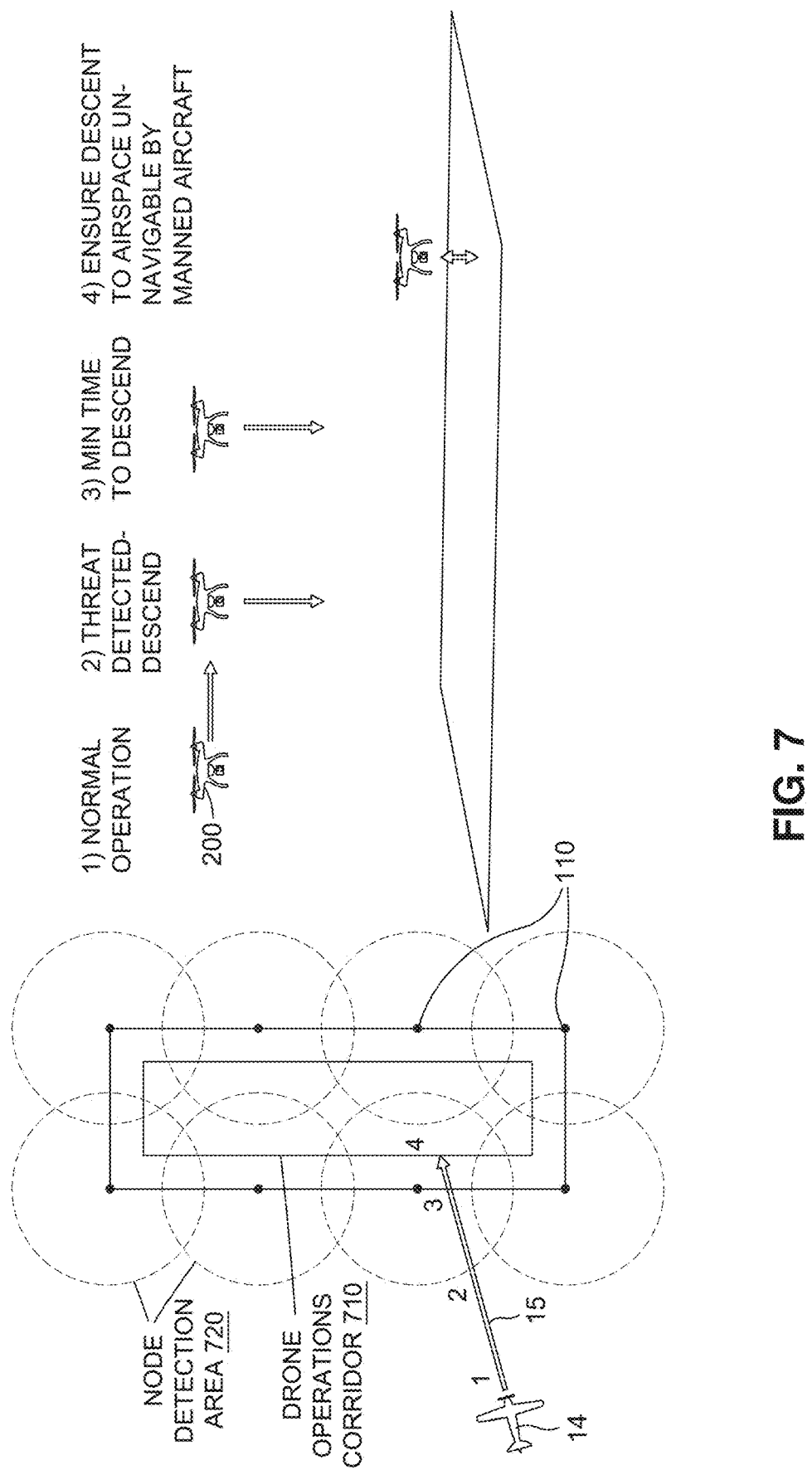
FIG. 7 is a schematic overhead view of the system illustrating a "keep-out" concept of operations.

FIG. 6 is a schematic side view of the system 10 illustrating a "keep-out" concept of operations. FIG. 7 is a schematic overhead view thereof. In the example of FIGS. 6 and 7, a UAV 200 is operating in a safe drone operating area 710, shown in the overhead view of FIG. 7 as a drone operations corridor 710. During normal operation of the UAV 200 within the area/corridor 710, the UAV 200 must share airspace with manned aircraft, such as the aircraft 14 that is shown approaching. Owing to the surrounding acoustic sensor installations 110 of the terrestrial acoustic sensor array 100 in a "keep-out" arrangement as described below, the area/corridor 710 may be considered "safe" for drone operations. The sensor node processor(s) 314 and master node processor(s) 324 may execute real-time software and/ or firmware based on the described "keep-out" concept of operations (ConOps) or a variety of other ConOps.

As depicted in FIG. 7, each of the acoustic sensor installations 110 defines a respective node detection area 720 representing the range of the acoustic sensor installation 110. When an aircraft enters within a node detection area 720 of one of the acoustic sensor installations 110, the noise of the aircraft will be loud enough for the acoustic sensor installation 110 to detect. Since some aircraft are louder than others, the node detection areas 720 may represent the detection range for the quietest aircraft that the terrestrial acoustic sensor array 100 is designed to detect at an acceptable detection probability (e.g. ≥99% detection probability within 3 km detection radius). By arranging the acoustic sensor installations 110 such that the node detection areas 720 overlap, the terrestrial acoustic sensor array 100 can therefore act as a "fence" that aircraft cannot pass without being detected. In this regard, it should be noted that the height of the terrestrial acoustic sensor array 100 may be selected with consideration given to the vertical range of operation of the UAVs 200 as well as the expected altitudes of manned aircraft. For instance, while it is contemplated that multiple acoustic sensor installations 110 may be stacked vertically in order to create a higher fence with overlapping node detection areas 720 in the vertical direction, it is also understood that the vertical range of operation of the UAVs 200 may in some cases make this unnecessary. For example, a very high-flying aircraft may be permitted to cross over the fence without being detected, so long as it would be practically impossible for the aircraft to subsequently descend to an altitude that would interfere with the UAVs 200 before completely crossing over the area/corridor 710.

The "keep out" arrangement of the terrestrial acoustic sensor array 100 shown in FIGS. 6 and 7 may function as follows. At time 1 (see FIG. 7), an aircraft 14 approaches the area/corridor 710 where UAVs 200 are operating normally. At this time, the aircraft 14 has not entered into the node detection area 720 of any of the acoustic sensor installations 110 and is thus out of range and not detected. At time 2, the aircraft 14 enters the node detection area 720 of one or more of the acoustic sensor installations 110. A side view of this moment in time is shown in FIG. 6, with the terrestrial acoustic sensor array ("TASA") declaration range representing the radius of one of the node detection areas 720. At this point, the detecting acoustic sensor installation(s) 110 and/or a master node 320 in communication therewith may detect the aircraft 14 and transmit a signal to control or warn the UAVs 200 that are operating within the area/corridor 710. In this example, the UAVs 200 may respond simply by descending to an airspace that is not navigable by manned aircraft, e.g. near the ground, such that the calculation of the flight path 15 of the aircraft 14 or even the locating of the aircraft 14 may not be necessary. In this way, the "keep-out" ConOps keeps the UAVs 200 safe while being relatively simple and requiring only a minimum node count to establish the "fence" without needing more involved aircraft tracking capability. Moving the UAV 200 close to ground may be an especially useful maneuver considering that many UAVs have relatively slow lateral maneuver capability.

Referring back to FIG. 7, the aircraft 14 crosses the "fence" at time 3, shown as the outer rectangle on which the eight acoustic sensor installations 110 are arranged. In FIG. 6, this is referred to as the TASA perimeter. In some cases, the area/corridor 710 of drone operations may be defined by the TASA perimeter. However, in order to provide additional time for the UAVs 200 to land after a threat is detected, an optional setback may be provided as shown in FIG. 6 and as represented by the space between the outer and inner rectangles in FIG. 7. As the aircraft 14 traverses this setback region, the UAVs 200 continue to descend. The setback region may be wide enough to provide the UAVs 200 with a minimum amount of time needed to descend, considering the descending speed of the UAVs 200 and the maximum height of normal UAV operations. Finally, at time 4, the aircraft 14 enters the safe drone operation area/corridor 710. Owing to the terrestrial acoustic sensor array 100, the UAVs 200 have all descended to a safe position by this time, allowing the aircraft 14 to fly overhead without risk of collision. Once the aircraft 14 has passed, normal operations of the UAVs 200 may resume. It is contemplated that the terrestrial acoustic sensor array 100 may determine that the aircraft 14 has passed, for example, by tracking the position of the aircraft 14 or simply by observing the disappearance of acoustic data associated with the aircraft 14.

Figure 8:
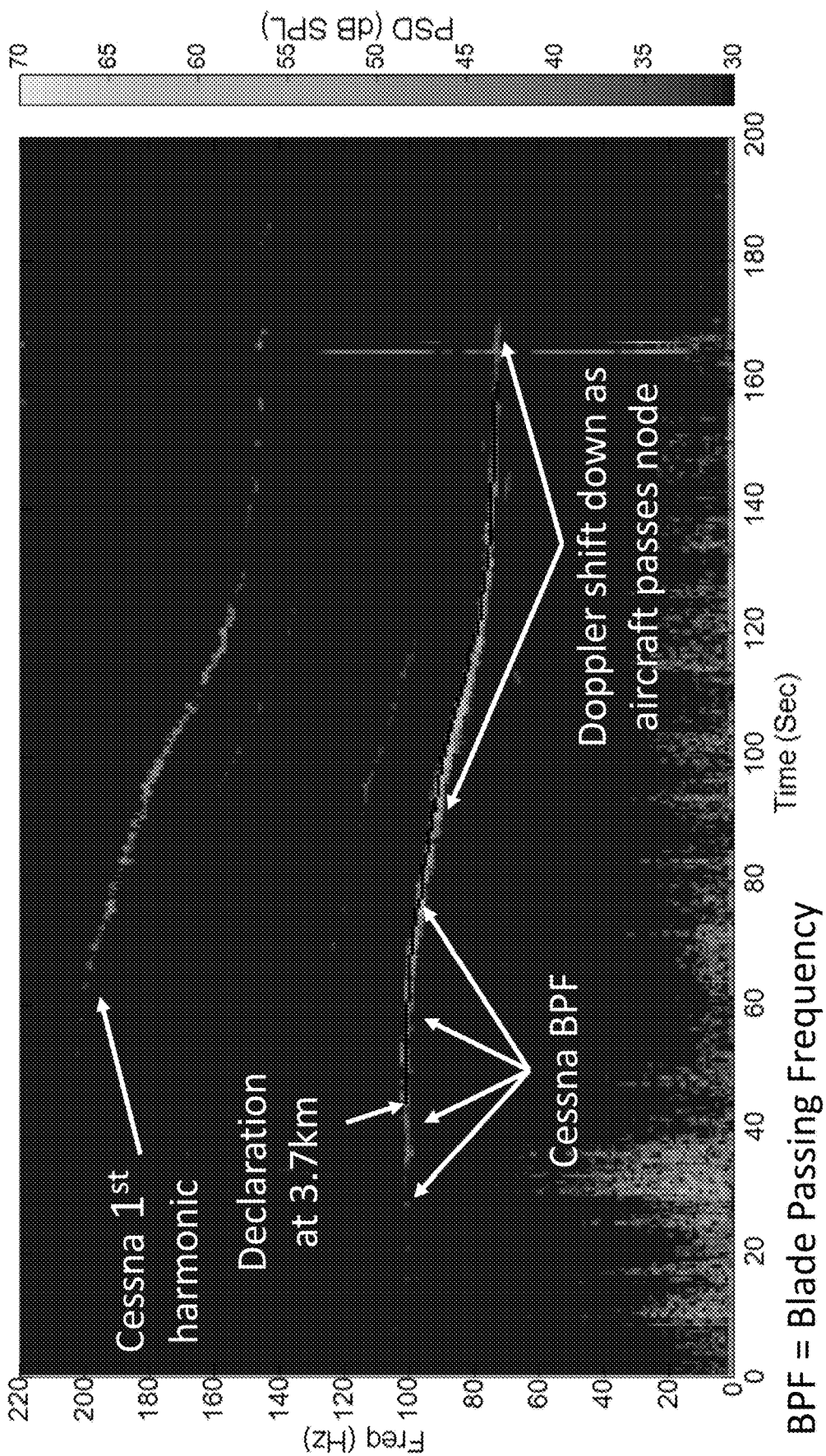
FIG. 8 is a graphical representation of an example of raw acoustic data of a sensor node of the terrestrial acoustic sensor array.

FIG. 8 is a graphical representation of an example of raw acoustic data of a sensor node 310 of the terrestrial acoustic sensor array 100. As described above, a recognition algorithm 317 of the sensor node processor 314 may recognize a particular aircraft type from the raw acoustic data captured by the microphone array 312. As shown, the sensor node 310 has picked up a blade passing frequency (BPF) of approximately 100 Hz and a first harmonic thereof at approximately double the BPF, indicative of a Cessna aircraft. At around 45 seconds on the x-axis, when the aircraft is 3.7 km from the sensor node 310, the sensor node 310 declares the presence of an aircraft based on the power spectral density (PSD) of the raw acoustic data indicating a high sound pressure level (dB SPL) at the BPF. The recognition algorithm 317 may subsequently identity the aircraft as a Cessna based on the unique frequency profile including the BPF and in some cases first harmonic thereof, and/or other features as described above (e.g. amplitude, position, position derivatives, etc.). The results of such identification may be included in the sensor data to be transmitted from the sensor node 310 to the master node 320. The results of the identification may constitute one of several estimates presented by sensor nodes 310 to the master node 320 for comparison and refinement. Alternatively, it is contemplated that the data shown in FIG. 8 may constitute the sensor data that is transmitted from a sensor node 310 to a master node 320, with the master node 320 running a recognition algorithm 317 thereafter. In this case, the identification of the aircraft may be based on the raw acoustic data from multiple sensor nodes 310, which may be combined to enhance the signal to noise ratio.

Unlike conventional UAV-mounted systems that increase the size and weight of the UAV, the disclosed arrays 100 of elevated acoustic sensor installations 110 can be ground-based, making size and weight less of a concern and significantly relaxing the demands on the system to distinguish an approaching aircraft's signatures from the UAV's own noise. The power requirements of the disclosed arrays 100 may also be minimal, e.g. less than 50 W/node. As a result, the disclosed systems can be installed at relatively low cost over large areas and/or on a temporary basis. For example, at the site of a one-time concert or sporting event or at a construction project site, the disclosed system can be installed in support of a fleet of aerial photography/videography UAVs. Similarly, the disclosed system can be installed at a disaster site to assist UAVs deployed for disaster relief efforts (e.g. locating hurricane victims, surveying wreckage, delivering food and other supplies, etc.). Temporary setups of the disclosed system may also be used in support of UAVs used for surveying or mapping difficult-to-access geographic regions such as eroded coastlines.

In addition to making temporary installations viable, the low cost of the disclosed system makes more permanent installations viable over very large areas. For example, the disclosed arrays of elevated acoustic sensor installations can be set up along shipping and delivery routes used by package-delivering UAVs (e.g. for same-day residential delivery). In some cases, such installations may be only semi-permanent in that the towers or other sensor installations can be moved to accommodate expanding or changing shipping/delivery routes. Additional examples of permanent or semi-permanent installations include agricultural uses, where the disclosed systems can be installed in support of UAVs that monitor crops (e.g. using infrared) and/or deliver fertilizer, insecticide, etc. Very large-scale permanent or semi-permanent systems can be installed along international borders in support of border patrol UAVs and in large wildlife areas in support of UAVs monitoring for illegal activity such as poaching and illegal deforestation.

Moreover, as UAVs become more prevalent and are deployed in high numbers patrolling the same areas or transiting the same corridors, the disclosed ground-based arrays 100 may be more practically scalable than conventional UAV-based detection systems, owing to their comparative simplicity. It is also contemplated that, in some circumstances, an abundance of safety may be served by the deployment of both the disclosed system 10 and airborne systems in combination, for example, with the ground-based and airborne systems working in tandem to issue an advisory to a UAV flight controller and suggest UAV actions to avoid collision.

In general, the disclosed system 10 may have applications in various industries where UAV operations may be beneficial. Applications in the construction industry may include, for example, stake plan model creation, construction progress monitoring, earthwork and volumetrics, contour mapping, and cut & fill mapping. Applications in the energy industry may include, for example, powerline corridor mapping, methane pipeline inspection, fixed site security (e.g. at a power plant or refinery), right of way assessment, and solar panel hotspot analysis. Applications in the communications industry may include, for example, cell tower inspection and cell tower vicinity inspection. Applications in the insurance industry may include, for example, flood plain mapping, property benchmarking, prompt/immediate post catastrophe inspection, damage classification, crop damage quantification, and commercial site materials auditing. Applications in the agriculture industry may include, for example, yield estimation, stand count quantification, retail & marketing auditing, weed-infestation identification, weed/infestation treatment status, and collection & storage auditing. Applications in the government perimeter monitoring industry may include, for example, coastal management, topography mapping (especially erosion zones), and border surveillance & monitoring. Applications in the government commerce operations industry may include, for example, positive control of vehicle progress (e.g. trains, trucks, aircraft) and commercial channel inspection (particularly post-catastrophe) in relation to roads and bridges, airports, and waterways.

The acoustic sensor installations 110 described in relation to the disclosed system 10 may be ground-based in the sense that they are not fixed to a UAV or other aircraft in flight. In the simplest of implementations, the acoustic sensor installations 110 may additionally be stationary, allowing for the greatest reductions in cost and the least consideration required with respect to noise cancelation. However, mobile ground-based acoustic sensor installations 110 (e.g. on a track or ground-based vehicle) are contemplated as well. Such mobile systems 10 may allow for rapid redeployment of the terrestrial acoustic sensor array 100 as needed.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A terrestrial acoustic sensor system for detecting and preventing airspace collision with an unmanned aerial vehicle (UAV), the terrestrial acoustic sensor system comprising:
   one or more ground-based acoustic sensor installations, each of the one or more acoustic sensor installations including a sub-array of microphones, at least one of the one or more acoustic sensor installations including one or more weather station instruments selected from the group consisting of a thermometer, a barometer, a wind vane, a wind sock, an anemometer, a hygrometer, a pyranometer, a rain gauge, and a precipitation sensor;
   one or more processors for detecting an aircraft based on sensor data collected from the microphones of at least one of the one or more acoustic sensor installations; and
   a network link for transmitting a signal to a control system of the UAV based on the detection of the aircraft and further based on a measurement of the one or more weather station instruments.

2. The terrestrial acoustic sensor system of claim 1, wherein the one or more processors is configured to determine a current or predicted environmental condition from the measurement of the one or more weather station instruments, and the transmitted signal is based on the current or predicted environmental condition.

3. The terrestrial acoustic sensor system of claim 1, wherein the transmitted signal comprises a recommendation that the UAV not complete a maneuver.

4. The terrestrial acoustic sensor system of claim 1, wherein the transmitted signal comprises a wind advisory.

5. The terrestrial acoustic sensor system of claim 1, wherein the transmitted signal comprises a recommendation that the UAV suspend flight.

6. The terrestrial acoustic sensor system of claim 1, wherein the network link is disposed in a master node of the terrestrial acoustic sensor array that is communicatively coupled to the one or more acoustic sensor installations by a wireless network.

7. The terrestrial acoustic sensor system of claim 6, wherein the master node comprises a cloud computing environment.

8. The terrestrial acoustic sensor system of claim 1, wherein
   the sub-array of microphones of each of the one or more acoustic sensor installations is arranged to distinguish azimuth and elevation of received sounds, and
   the sensor data includes azimuth and elevation data collected from the microphones of the at least one of the one or more acoustic sensor installations.

9. The terrestrial acoustic sensor system of claim 1, wherein the sensor data includes frequency and amplitude data collected from the microphones of the at least one of the one or more acoustic sensor installations.

10. The terrestrial acoustic sensor array of claim 1, wherein each of the one or more acoustic sensor installations includes a tower structure for disposing the sub-array of microphones at an elevated height.

11. The terrestrial acoustic sensor array of claim 1, wherein each of the one or more acoustic sensor installations includes a body for mounting the sub-array of microphones to a building or terrain feature.

12. The terrestrial acoustic sensor array of claim 1, wherein the control system of the UAV comprises a human-operated pilot console that generates a human-interpretable warning in response to receipt of the transmitted signal.

13. The terrestrial acoustic sensor array of claim 1, wherein the control system of the UAV comprises a flight controller included in the UAV that controls a position of the UAV in response to receipt of the transmitted signal.

14. The terrestrial acoustic sensor array of claim 13, wherein the flight controller initiates an evasive maneuver of the UAV or reroutes the UAV in response to receipt of the transmitted signal.

15. The terrestrial acoustic sensor array of claim 14, wherein the flight controller reroutes the UAV to an airspace that is non-navigable by manned aircraft in response to receipt of the transmitted signal.

16. The terrestrial acoustic sensor array of claim 1, wherein the UAV is controlled from a cloud computing environment.

17. A system comprising:
   the terrestrial acoustic sensor array of claim 1; and
   the UAV.

18. The system of claim 17, wherein
   the UAV includes a global positioning system (GPS) receiver, and the transmitted signal is further based on GPS data collected from the GPS receiver of the UAV.

19. A non-transitory program storage medium on which are stored instructions executable by a processor or programmable circuit to perform operations for detecting and preventing airspace collision with an unmanned aerial vehicle (UAV), the operations comprising:

detecting an aircraft based on sensor data collected from microphones of at least one of one or more ground-based acoustic sensor installations; and transmitting a signal to a control system of the UAV based on the detection of the aircraft and further based on a measurement of one or more weather station instruments included in at least one of the one or more ground-based acoustic sensor installations, the one or more weather station instruments being selected from the group consisting of a thermometer, a barometer, a wind vane, a wind sock, an anemometer, a hygrometer, a pyranometer, a rain gauge, and a precipitation sensor.

20. A method of detecting and preventing airspace collision with an unmanned aerial vehicle (UAV), the method comprising:

detecting an aircraft based on sensor data collected from microphones of at least one of one or more ground-based acoustic sensor installations; and transmitting a signal to a control system of the UAV based on the detection of the aircraft and further based on a measurement of one or more weather station instruments included in at least one of the one or more ground-based acoustic sensor installations, the one or more weather station instruments being selected from the group consisting of a thermometer, a barometer, a wind vane, a wind sock, an anemometer, a hygrometer, a pyranometer, a rain gauge, and a precipitation sensor.

\* \* \* \* \*